(12) United States Patent
West

(10) Patent No.: US 8,760,826 B2
(45) Date of Patent: Jun. 24, 2014

(54) BIPOLAR DC TO AC POWER CONVERTER WITH DC GROUND FAULT INTERRUPT

(71) Applicant: Xantrex Technology, Inc., Arlington, WA (US)

(72) Inventor: Richard T. West, San Simeon, CA (US)

(73) Assignee: Schneider Electric Solar Inverters USA, Inc., Livermore, CA (US)

( * ) Notice: Subject to any disclaimer, the term of this patent is extended or adjusted under 35 U.S.C. 154(b) by 0 days.

(21) Appl. No.: 13/860,993

(22) Filed: Apr. 11, 2013

(65) Prior Publication Data

US 2013/0223113 A1 Aug. 29, 2013

Related U.S. Application Data

(63) Continuation of application No. 12/530,196, filed as application No. PCT/US2007/005897 on Mar. 6, 2007, now Pat. No. 8,467,160.

(51) Int. Cl.
*H02H 3/00* (2006.01)

(52) U.S. Cl.
USPC .......................................................... 361/42

(58) Field of Classification Search
CPC ........... H02H 3/17; H02H 3/16; H02H 3/162; H02H 3/167; H02H 3/32; H02H 7/1222; H01H 83/02; H02M 7/44; H02M 7/5387
See application file for complete search history.

(56) References Cited

U.S. PATENT DOCUMENTS

| | | | | |
|---|---|---|---|---|
| 4,580,186 | A | * | 4/1986 | Parker et al. ............ 361/42 |
| 5,712,572 | A | | 1/1998 | Tamechika et al. |
| 6,678,132 | B1 | * | 1/2004 | Roden et al. ............ 361/42 |
| 6,856,137 | B2 | | 2/2005 | Roden et al. |
| 6,856,497 | B2 | | 2/2005 | Suzui et al. |
| 6,992,490 | B2 | | 1/2006 | Nomoto et al. |
| 7,079,406 | B2 | | 7/2006 | Kurokami et al. |
| 2001/0023703 | A1 | | 9/2001 | Kondo et al. |
| 2002/0094460 | A1 | | 7/2002 | Hortop |
| 2003/0075211 | A1 | | 4/2003 | Makita et al. |
| 2005/0018454 | A1 | | 1/2005 | Deng et al. |
| 2006/0227472 | A1 | | 10/2006 | Taylor et al. |
| 2006/0237057 | A1 | | 10/2006 | Buij et al. |

FOREIGN PATENT DOCUMENTS

JP 01-163809 * 6/1989

OTHER PUBLICATIONS

European Search Report from corresponding European Patent Application No. EP 07752585.5, dated Nov. 5, 2012 (6 pages).
International Search Report and Written Opinion from corresponding International Patent Application No. PCT/US2007/005897, dated Jul. 29, 2008 (10 pages).

* cited by examiner

*Primary Examiner* — Jared Fureman
*Assistant Examiner* — Terrence Willoughby

(57) ABSTRACT

An electrical power converter for converting power from a bipolar DC source to supply an AC load is disclosed. For one such embodiment the bipolar DC source is a photovoltaic array and the AC power is sourced into an electric power grid. The bipolar photovoltaic array has positive and negative voltage potentials with respect to earth ground. The converter is a utility interactive inverter which does not require an isolation transformer at the electric power grid interface. Embodiments of the invention include methods of detecting and interrupting DC ground faults in the photovoltaic array.

9 Claims, 5 Drawing Sheets

BIPOLAR DC TO AC POWER CONVERTER WITH DC GROUND FAULT INTERRUPT

CROSS REFERENCE TO RELATED APPLICATIONS

This application is a continuation of and claims the benefit of prior application Ser. No. 12/530,196, filed Sep. 4, 2009, which is a U.S. National Stage of International Application No. PCT/US2007/005897, filed Mar. 6, 2007, both of which are incorporated herein by reference in their entireties.

DESCRIPTION

1. Field

Embodiments of the invention relates to electrical power converters and more specifically, converting power from a bipolar DC source to supply an AC load.

2. Background

In the United States, two solar photovoltaic (PV) array configurations are permitted by the National Electric Code (NEC), Section 690, grounded and ungrounded. The maximum voltage of a PV array is limited to 600 Vdc with respect to earth in ground systems and 600 Vdc in ungrounded systems. The NEC also requires that PV systems installed on dwellings have a means of detecting and interrupting fault currents from the PV array to earth ground. These faults are commonly caused by water intrusion into wiring junction boxes, degradation of the array wiring insulation, or a failure in the solar module insulating materials. These faults can cause a low energy leakage path or a destructive direct current arc. The intent of the code, with respect to ground faults, is fire protection, not personnel protection.

FIG. 5 shows a circuit topology for a utility grid interactive, PV power converter in accordance with the prior art. In a typical (PV) power plant, a number of solar panels are connected in series. This is represented by solar generators 2 through 5. Typically, conventional power converters operate from grounded monopolar PV arrays, i.e. arrays with one polarity with respect to ground. Fault 1 illustrates a fault scenario where an unwanted current path has developed between solar generators 4 and 5 and earth ground. PV array 10 connects to power converter 30 at terminals 21 and 22. The earth ground connection for PV array 10 is made through fuse 32 and terminal 23 to ground rod 6. If the current from fault 1 is great enough, fuse 32 will clear, the fault current path will be broken, PV array 10 will become ungrounded and operation of power converter 30 will be locked out by control board 80 until the ground fault is cleared and a manual reset is initiated on control board 80.

DC to AC converter 30 is a typical 3-phase bridge configuration and operates as a utility grid interactive inverter by regulating sinusoidal 3-phase currents in phase with the voltages across transformer windings 54, 55 and 56. Semiconductor switches 33 through 38 are gated on and off at high frequencies by control board 80 to regulate currents through filter inductors 39 through 41. Filter inductors 39-41 and filter capacitors 45-47 integrate the high frequency, pulse width modulated output from switches 33-38. Reference current waveforms are compared to the actual current measured by sensors 39, 40 and 41. Three servo loops on control board 80 regulate undistorted sinusoidal currents into transformer 50. Windings 51, 52 and 53 of transformer 50 are connected to 3-phase power grid 70 at power converter 30 output terminals 61-64. Because PV array 10 is monopolar and ground referenced and 3-phase power grid 70 is bipolar and ground referenced, isolation transformer 50 is required for level translation. Transformer 50 is also required to boost the voltage of the power converter output to allow the power converter tie into power grid 70 at 120/208 Vac or higher.

The invention is an improvement over the prior art because the weight, size, cost and conversion losses of the isolation transformer can be eliminated. In addition the maximum DC working voltage of the DC to AC converter can be effectively doubled thereby reducing the current by half for a given power level for an additional cost reductions and performance enhancements.

SUMMARY OF THE INVENTION

Embodiments of the invention provide an apparatus for converting power from a bipolar DC source to supply an AC load. The bipolar DC source has a positive and negative monopole, and corresponding voltage potentials, with respect to a common earth ground or with respect to a neutral point of an AC load. The apparatus also includes a DC ground fault interrupt circuit having a means for detecting a fault current in either monopole of the bipolar DC source to earth ground or to a neutral point of the AC load and a means of automatically interrupting the flow of said fault current Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
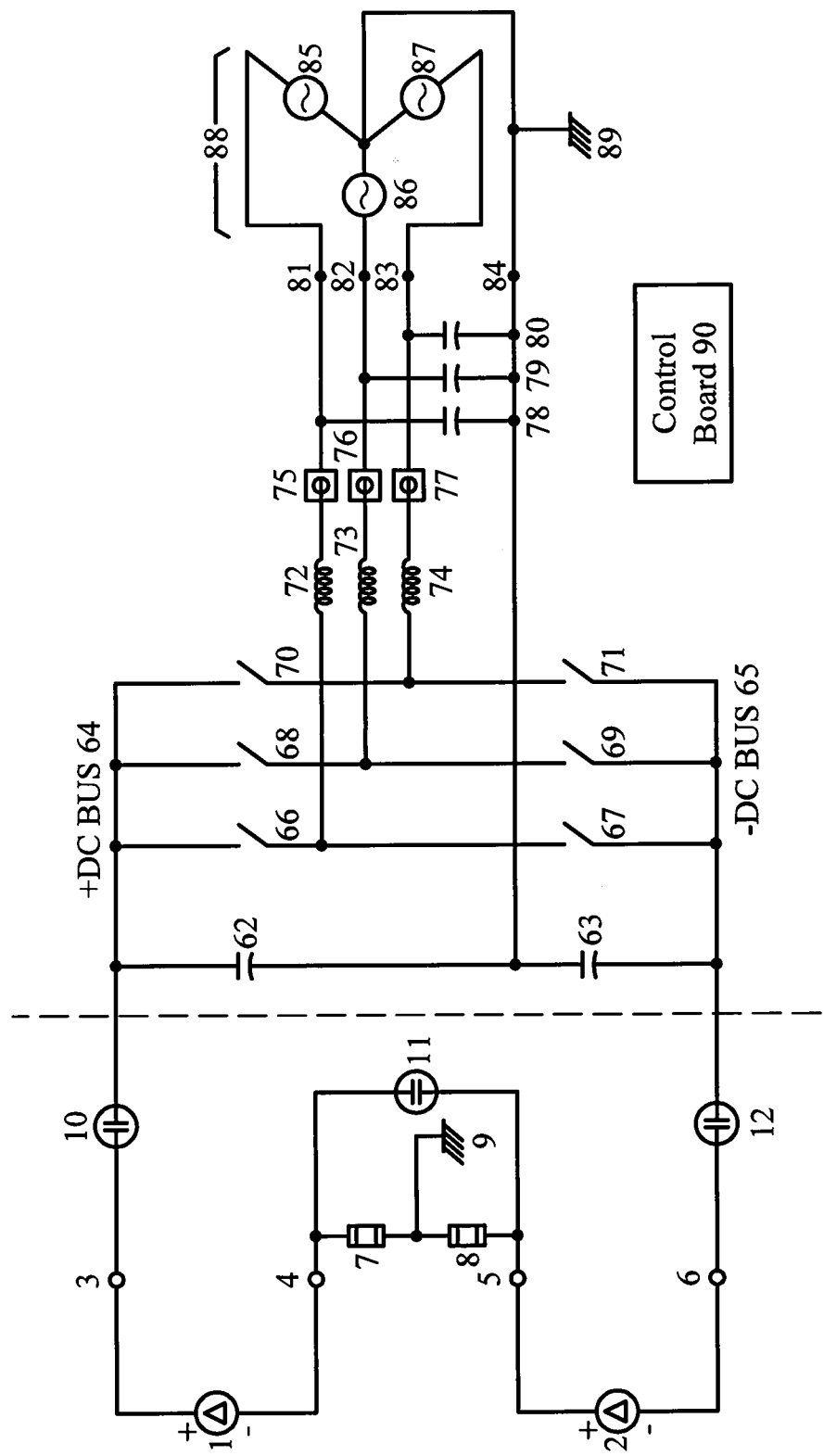
FIG. 1 illustrates a DC-to-AC power converter in accordance with one embodiment of the invention.

Embodiments of the invention provide apparatuses for converting power from a bipolar DC source to supply an AC load is disclosed. For one such embodiment the bipolar DC source is a PV array and the AC power is sourced into an electric power grid. The bipolar PV array has positive and negative voltage potentials with respect to earth ground. The converter is a utility interactive inverter which does not require an isolation transformer at the electric power grid interface. Embodiments of the invention include methods of detecting and interrupting DC ground faults in the PV array.

Those of ordinary skill in the art will realize that the following detailed description of various embodiments of the invention is illustrative only and is not intended to be in any way limiting. Other embodiments of the invention will readily suggest themselves to such skilled persons having the benefit of this disclosure. It will be apparent to one skilled in the art that these specific details may not be required to practice embodiments of the invention. In other instances, well-known circuits and devices are shown in block diagram form to avoid obscuring the invention. In the following description of the embodiments, substantially the same parts are denoted by the same reference numerals.

In the interest of clarity, not all of the features of the implementations described herein are shown and described. It will, of course, be appreciated that in the development of any such actual implementation, numerous implementation-specific devices must be made in order to achieve the developer's specific goals, wherein these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

While particular embodiments of the invention have been shown and described, it will now be apparent to those skilled in the art having the benefit of this disclosure that many more modifications than mentioned above are possible without departing from the inventive concepts disclosed herein. Moreover, inventive aspects lie in less than all features of a single disclosed embodiment. Thus, the claims following the Detailed Description are hereby expressly incorporated into this Detailed Description, with each claim standing on its own as a separate embodiment of this invention.

FIG. 1 illustrates a DC-to-AC power converter in accordance with one embodiment of the invention. PV array 1 is connected across input terminals 3 and 4 of the inverter. PV array 2 is connected across input terminals 5 and 6. Terminals 4 and 5 are connected to earth ground 9 through fuses 7 and 8 respectively. Contactor 10 connects terminal 3 to +DC BUS 64 and contactor 12 connects terminal 6 to -DC BUS 65. Contactor 11 connects terminals 4 and 5. Contactors 10, 11 and 12 are normally open and are closed by commands from control board 90. Capacitors 62 and 63 are energy storage elements connected in series across the plus and minus DC buses, 64 and 65. The common connection point of capacitors 62 and 63 is connected to AC neutral at terminal 84. Semiconductor switches 66-71 are typically IGBT (Insulated Gate Bipolar Transistor) devices commanded on and off by control board 90. Switches 66-71 and filter inductors 72-74 are arranged in a typical, known, three-phase bridge configuration. Capacitors 78-80 provide a second filter pole for each of the three phases and a high frequency return path to DC bus capacitors 62 and 63. The inverter is connected to power grid 88 at terminals 81-84. Neutral connection 84 is connected to a ground rod to make earth connection 89 as required by the National Electric Code. AC power grid 88 could be a typical 120/208 Vac commercial service.

Control board 90 alternately commands switches 66 and 67 into conduction at different on/off ratios. A net current is produced, filtered by inductor 72 and capacitor 78, which flows into utility grid phase 85 at terminal 81. Control board 90 commands switches 66 and 67 in such a way as to produce a sinusoidal current into AC power grid 88 that is in phase with the voltage at terminal 81 with respect to neutral terminal 84 to achieve unity-power-factor power transfer into utility grid 88. The actual current through inductor 72 is measured by current sensor 75 and compared to a desired, sinusoidal reference value to regulate the current through inductor 72 in a classic servo loop. Currents into terminals 82 and 83 are produced in the same manner. Since the connection at utility grid 88 is a 4-wire, grounded Wye configuration and the DC source is ground referenced as well, each of the three phases operate independently. Control and regulation methodologies for utility grid interactive inverters are known and are not part of this invention. The invention is power converter topology with a unique arrangement of power components.

Under normal operating conditions, contactors 10, 11 and 12 will be closed and fuses 7 and 8 will be in parallel. The currents through fuses 7 and 8 will effectively be zero. If a fault to ground in either PV array 1 or 2 produces a fault current large enough to clear either fuse 7 or 8 or both, a blown fuse indicator signal is sent to control board 90. In response, control board 90 releases (opens) contactors 10-12. The ground fault current is interrupted when a fuse is or fuses are cleared.

Figure 2:
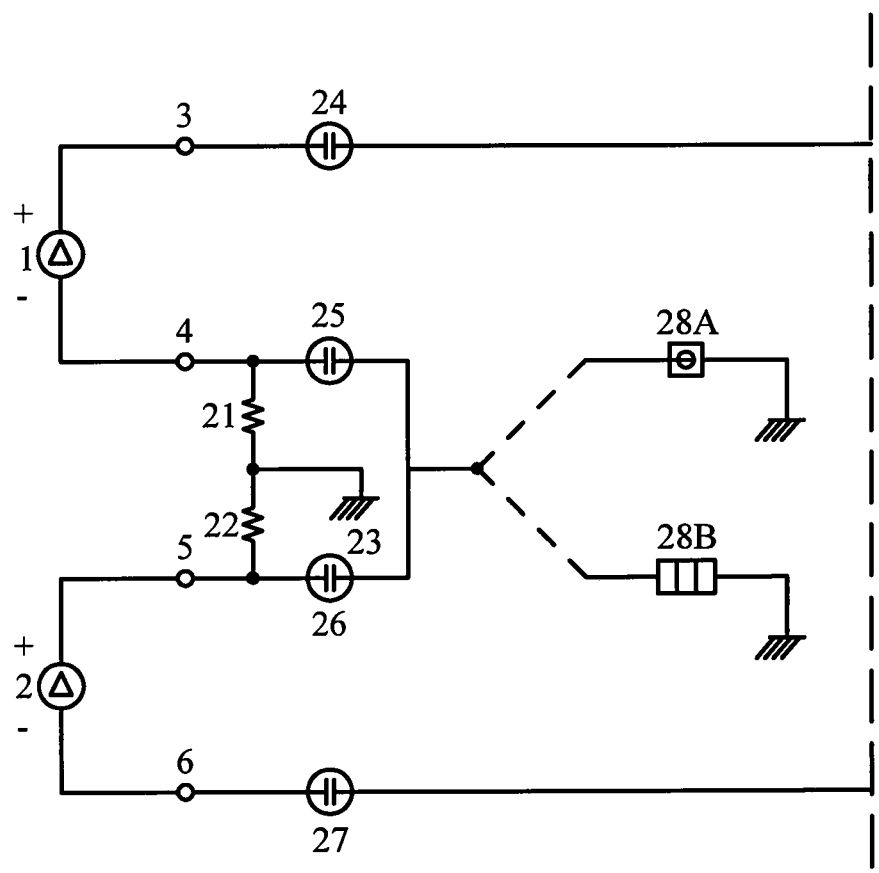
FIG. 2 illustrates an alternate embodiment of the invention where four normally open contactors are used.

FIG. 2 illustrates an alternate embodiment of the invention where four normally open contactors 24-27 are used. With this topology, fault current, to ground, in either PV array 1 or 2 is either sensed by current sensor 28A and compared to a preset trip level on control board 90 or indicating fuse 28B sends a signal to control board 90 when fuse 28B is cleared by ground fault current. In response, contactors 24-27 are opened thus interrupting the flow of fault current. Resistors 21 and 22 are used to discharge static charge on PV arrays 1 and 2 respectively and to provide a soft voltage reference for said arrays when contactors 24-27 are open.

Figure 3:
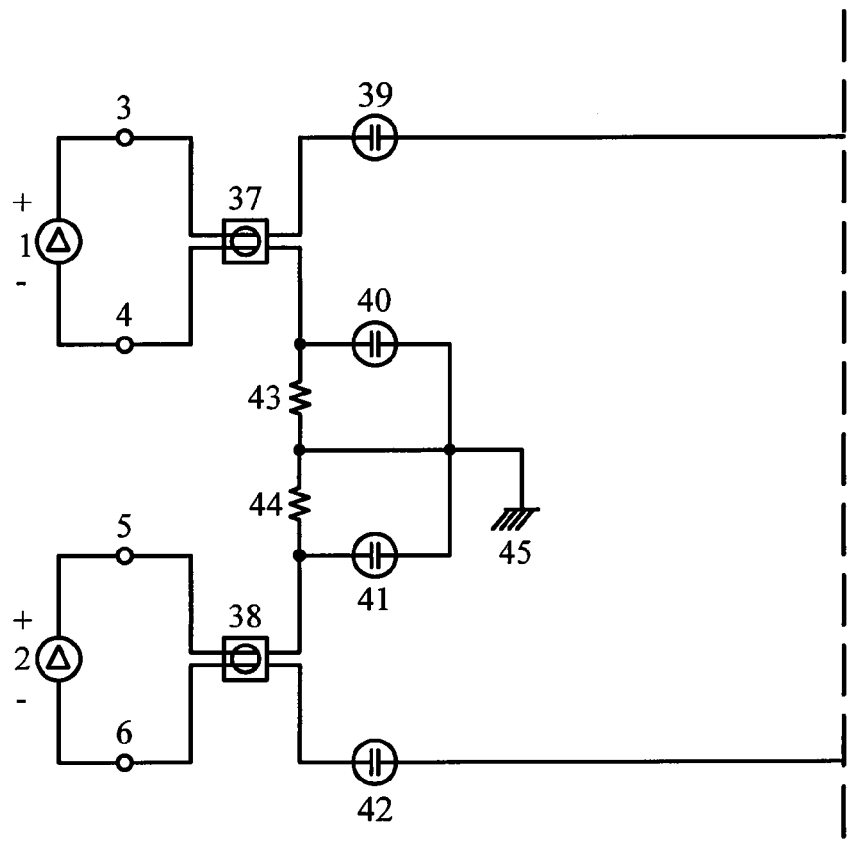
FIG. 3 illustrates an alternative embodiment of the invention where DC current sensors measure the differential current in the PV arrays.

FIG. 3 illustrates an alternative embodiment of the invention where DC current sensors 37 and 38 measure the differential current in PV arrays 1 and 2 respectively. Any current flowing into terminal 3 must return out of terminal 4. If not, there is a fault to ground equal in magnitude to the difference of these two currents. An analogous method is used for sensing ground fault currents in PV array 2.

Figure 4:
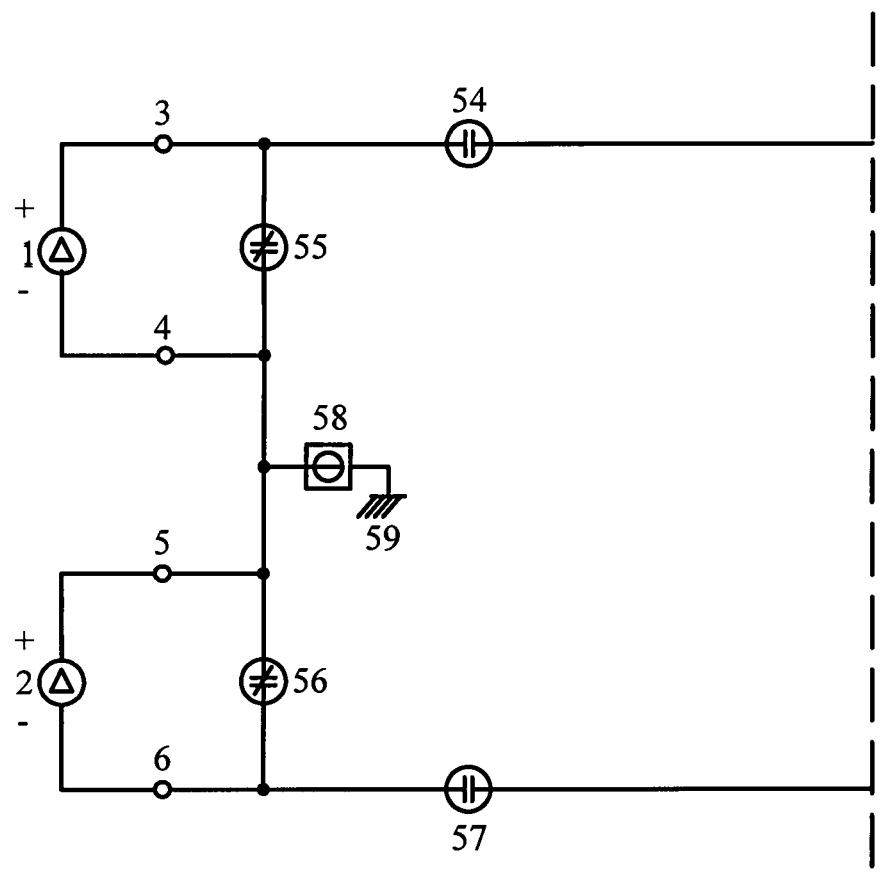
FIG. 4 illustrates an alternative embodiment of the invention where two normally open contactors are used in conjunction with two normally closed contactors.
Figure 5:
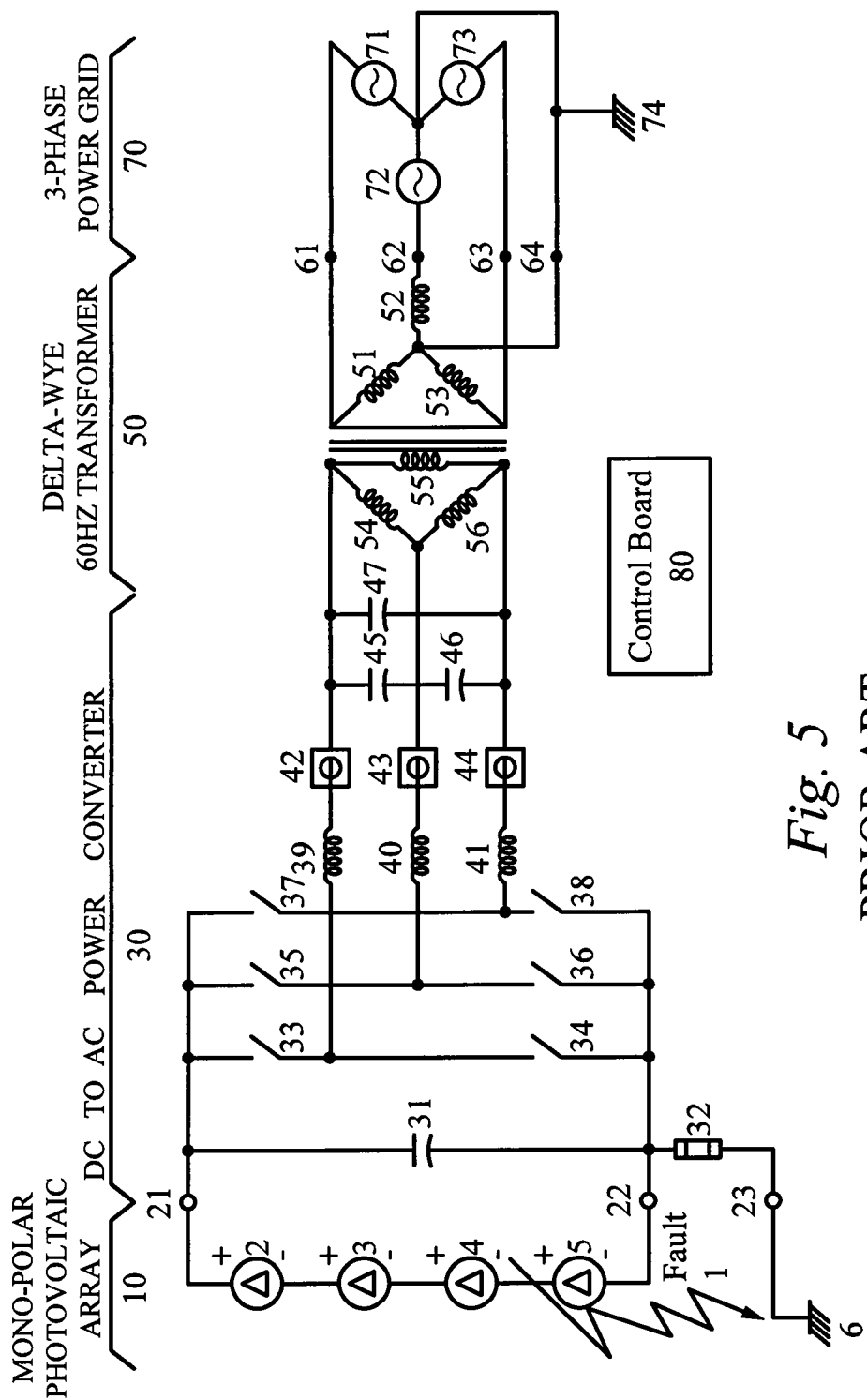
FIG. 5 shows a circuit topology for a utility grid interactive, PV power converter in accordance with the prior art.

FIG. 4 illustrates an alternative embodiment of the invention where two normally open contactors 54 and 57 are used in conjunction with two normally closed contactors 55 and 56. In normal operation contactors 54 and 57 are closed and contactors 55 and 56 are open. When current sensor 58 detects a ground fault current exceeding a preset trip level, contactors 54 and 57 are opened and contactors 55 and 56 are closed. In the topologies disclosed in FIGS. 1 through 3, ground fault current was interrupted by opening the intended earth connection and floating the PV array. In the topology shown in FIG. 4, the voltage potentials across arrays 1 and 2 are short circuited by contactors 55 and 56 respectively, thereby removing any voltage potential to ground and therefore any current to ground. Unlike the topologies disclosed in FIGS. 1 through 3, PV arrays 1 and 2 remain hard grounded under all conditions.

General Matters

Various embodiment of the invention have been described above in reference to FIGS. 1-4. In accordance with various embodiments of the invention, in any of the topologies disclosed, fault current can be sensed by (i) differential measurement or calculation of the net current in the carrying conductor currents of any given 2-wire PV array monopole (ii) measurement of the current in a PV connection to earth ground (iii) the "open" signal of an indicating fuse from a fuse in the path of the PV array and earth ground connection.

Embodiments of the invention have been described as including various operations. Many of the processes are described in their most basic form, but operations can be added to or deleted from any of the processes without departing from the scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus for converting power from a bipolar DC source to supply an AC load comprising:
   at least one output phase terminal for coupling to the AC load;
   an output neutral terminal for coupling to the AC load;
   a bipolar DC source coupled to the at least one output phase terminal and coupled to the output neutral terminal and having a positive and negative monopole, and corresponding voltage potentials, with respect to a common earth ground; and
   a DC ground fault interrupt circuit including a means for detecting a fault current in either monopole of the bipolar DC source to the common earth ground and a means of automatically interrupting the flow of said fault current;
   wherein the common earth ground is coupled to the output neutral terminal.

2. The apparatus of claim 1 wherein the bipolar DC source is a photovoltaic array, a battery, a fuel cell, a reciprocating generator, a turbine generator or combination thereof.

3. The apparatus of claim 1 in which each of said monopoles includes first and second output terminals,
   said first output terminals being controllably coupled to a DC-to-AC power converter circuit,
   said second output terminals being coupled to the common earth ground and controllably coupled to each other.

4. The apparatus of claim 3 which includes a pair of controllable DC contactors controllably coupling said first output terminals to said DC-to-AC power converter circuit, and a third controllable contactor controllably coupling said second output terminals being controllably coupled to each other.

5. The apparatus of claim 3 in which said second output terminals are coupled to the common earth ground through a pair of fuses.

6. The apparatus of claim 3 in which said second output terminals are controllably coupled to each other by at least a third controllable third contactor.

7. An apparatus for converting power from a DC source to supply an AC load comprising
   at least one output phase terminal for coupling to the AC load;
   an output neutral terminal for coupling to the AC load;
   a bipolar DC source coupled to the at least one output phase terminal and coupled to the output neutral terminal and having positive and negative monopoles each of which has first and second output terminals,
   a DC-to-AC power converter circuit having first and second input terminals, first and second DC contactors controllably coupling said first output terminals of said positive and negative monopoles to said input terminals of said DC-to-AC power converter,
   a common ground connection for said second output terminals of said positive and negative monopoles, wherein the common ground connection is coupled to the output neutral terminal, and
   in which said common ground connection maintains connection of said second output terminals of said monopoles to ground in the absence of a DC ground fault.

8. An apparatus for converting power from a bipolar DC source to supply an AC load comprising:
   at least one output phase terminal for coupling to the AC load;
   an output neutral terminal for coupling to the AC load;
   a bipolar DC source coupled to the at least one output phase terminal and coupled to the output neutral terminal and having positive and negative monopoles, and corresponding voltage potentials, with respect to a common earth ground;
   a DC ground fault interrupt circuit responsive to a fault current in either monopole of the bipolar DC source to the common earth ground for automatically interrupting the flow of said fault current, wherein the common earth ground is coupled to the output neutral terminal; and
   wherein the bipolar DC source is a photovoltaic array, a battery, a fuel cell, a reciprocating generator, a turbine generator or combination thereof.

9. An apparatus for converting power from a bipolar DC source to supply an AC load comprising:
   at least one output phase terminal for coupling to the AC load;
   an output neutral terminal for coupling to the AC load;
   a bipolar DC source having positive and negative monopoles, and corresponding voltage potentials, with respect to a common earth ground;
   a DC-to-AC power converter circuit having an input terminal coupled to the bipolar DC source and having a first output coupled to the at least one output phase terminal and a second output coupled to the output neutral terminal;
   a DC ground fault interrupt circuit responsive to a fault current in either monopole of the bipolar DC source to the common earth ground, for automatically interrupting the flow of said fault current, wherein the common earth ground is coupled to the output neutral terminal; and
   where the AC load is an electric power grid and the DC-to-AC power converter functions as a grid interactive inverter.

* * * * *